United States Patent
Kameyama et al.

(10) Patent No.: US 7,255,585 B2
(45) Date of Patent: Aug. 14, 2007

(54) CASING MEMBER WITH CONNECTOR PORTION

(75) Inventors: Isao Kameyama, Haibara-gun (JP); Takashi Toi, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/124,076

(22) Filed: May 9, 2005

(65) Prior Publication Data

US 2005/0250364 A1 Nov. 10, 2005

(30) Foreign Application Priority Data

May 10, 2004 (JP) ............................ P.2004-140194

(51) Int. Cl.
*H01R 13/52* (2006.01)
(52) U.S. Cl. ..................................... 439/271
(58) Field of Classification Search ............... 439/271, 439/272–277, 587–589
See application file for complete search history.

(56) References Cited

U.S. PATENT DOCUMENTS

| | | | | |
|---|---|---|---|---|
| 3,221,292 A | * | 11/1965 | Swanson et al. | 439/589 |
| 3,271,726 A | * | 9/1966 | Pfendler | 439/76.1 |
| 4,445,748 A | * | 5/1984 | Evans | 439/271 |
| 4,477,136 A | * | 10/1984 | Smith | 439/289 |
| 4,479,691 A | * | 10/1984 | Smith, Jr. | 439/744 |
| 4,629,269 A | * | 12/1986 | Kailus | 439/587 |
| 4,726,788 A | * | 2/1988 | F'Geppert | 439/551 |
| 4,797,122 A | * | 1/1989 | Kuboi et al. | 439/589 |
| 5,151,045 A | * | 9/1992 | Cravens et al. | 439/271 |
| 5,334,039 A | * | 8/1994 | Kanda | 439/271 |
| 6,039,592 A | * | 3/2000 | Shinchi | 439/271 |
| 6,464,522 B2 | * | 10/2002 | Osawa et al. | 439/271 |

FOREIGN PATENT DOCUMENTS

| | | |
|---|---|---|
| JP | 9-245880 A | 9/1997 |
| JP | 2002-231375 A | 8/2002 |

* cited by examiner

*Primary Examiner*—Gary F. Paumen
(74) *Attorney, Agent, or Firm*—Sughrue Mion, PLLC

(57) ABSTRACT

A length of that portion of each of connection terminals 19 which projects from a partition wall 11*a* into a sealing member chamber 21, and includes an electrical contact portion 19*a* is larger than a length of an outer peripheral wall 11*d* of a connector portion 18, extending from the partition wall 11*a* in surrounding relation to the electrical contact portions 19*a* of the connection terminals 19 to form the sealing member chamber 21, so that at least distal end portions of the electrical contact portions 19*a* of the connection terminals 19 project outwardly from the connector portion 18 in a direction of fitting of the connector portion 18 to a mating connector 33.

3 Claims, 5 Drawing Sheets

CASING MEMBER WITH CONNECTOR PORTION

BACKGROUND OF THE INVENTION

1. Field of the Invention

This invention relates to a casing member with a connector portion, and more particularly to a casing member for containing an electrical equipment in a sealed condition.

2. Related Art

For example, an on-vehicle CCD (Charge Coupled Device) camera unit (which is an electrical equipment) is required to have a high degree of air-tightness (that is, high sealing ability) in order to protect this on-vehicle CCD camera unit from foreign matters such as dirt, dust and water.

Incidentally, most car batteries, mounted on vehicles, have a rated output voltage value of 12 V (volt), and there are other car batteries having their respective rated output voltage values of 24V, 36V and so on.

On the other hand, an internal operating voltage of the on-vehicle CCD camera unit is lower (for example, on the order of above 3V) in value than the output voltage of the car battery, and therefore a DC/DC converter is provided at the on-vehicle CCD camera unit, and electric power, supplied from the car battery, is converted into an internal operating voltage of the on-vehicle CCD camera unit by this DC/DC converter.

Heat is generated due to a loss developing during the voltage converting operation by the DC/DC converter of the on-vehicle CCD camera unit, and this heat much increases the temperature within a casing member containing the on-vehicle CCD camera unit in a sealed condition. Therefore, in view of a heat-radiating ability, the casing member made of metal such as aluminum has been used by preference.

There is known a technique in which an on-vehicle CCD camera unit with a connector portion is mounted in a casing member made, for example, of aluminum, and a gap between the connector portion of the on-vehicle CCD camera unit and the casing member is sealed by a sealing member (rubber plug), thereby sealing the casing member (see, for example, Unexamined Japanese Patent Publication 2002-231375).

In recent years, the amount of generation of heat from a DC/DC converter has been much reduced because of its improved voltage conversion efficiency, and it has now become unnecessary to use a metallic casing member for containing an on-vehicle CCD camera unit with such a DC/DC converter in a sealed condition.

Therefore, there has been the trend toward a technique in which a synthetic resin-made casing member for containing an on-vehicle CCD camera unit is used in order to achieve a lightweight design, the cost reduction, etc. In the development of such synthetic resin-made casing members, a study has been made of the technique of molding a connector with connection terminals (for electrical connection to an on-vehicle CCD camera unit to be contained in a casing member) integrally with this casing member. More specifically, a study has been made of the technique of forming the casing member, having a connector portion having the connection terminals, by insert molding.

However, even when the insert molding is effected, fine gaps develop between the connection terminals and the molded resin, and therefore a sealing member is provided in the connector portion (having the connection terminals) so as to be held in intimate contact with the connection terminals. In order to eliminate adverse effects of foreign matters (such as dirt, dust and water) on the on-vehicle CCD camera unit, the casing member for containing the on-vehicle CCD camera unit in a sealed condition is required to have such a high sealing ability that leakage will not occur even when the casing member is subjected to a pressure, for example, of 400 kPa.

As one example of connectors employing a sealing member, there is known one in which connection terminals extend through a sealing member in intimately-contacted relation thereto (see, for example, Unexamined Japanese Patent Publication Hei. 9-245880). In the connector disclosed in this reference, the connection terminals extend through the sealing member in intimately-contacted relation thereto, and in this condition the sealing member is mounted within a connector connecting chamber (that is, a sealing member chamber).

The connector connecting chamber of the connector has a predetermined length (that is, a depth) so as to be inserted into a mating connector while guiding this mating connector so that the male connection terminals, extending through the sealing member in intimately-contacted relation thereto, can be positively connected respectively to female connection terminals provided in the mating connector.

Therefore, when the mating connector is to be connected to the connector connecting chamber of the connector disclosed in Unexamined Japanese Patent Publication Hei. 9-245880, first, an inner peripheral wall of an open end portion of the connector connecting chamber is fitted on an outer peripheral wall of the mating connector, and the mating connector is guided by the inner peripheral wall of the connector connecting chamber, thereby positioning the two connectors relative to each other, and thereafter the connection terminals are connected respectively to the connection terminals of the mating connector. Therefore, the length of projecting of the connection terminals into the connector connecting chamber is smaller than the depth of the connector connecting chamber, and the distal ends of these connection terminals are recessed from the open end surface of the connector connecting chamber.

In the connector structure disclosed in the reference, when mounting the sealing member in the connector connecting chamber, first, the sealing member is inserted into the connector connecting chamber through the open end thereof, and then the connection terminals are passed respectively through terminal passage holes in the sealing member. Therefore, this operation has been difficult, and has required much time, so that the efficiency of the assembling operation has been low.

Particularly with respect to the sealing member designed to achieve a high sealing performance, annular lips for contact with the inner peripheral wall of the connector connecting chamber are formed on and project from the outer peripheral surface of the sealing member, and the sealing member is inserted (press-fitted) into the connector connecting chamber, with the annular lips squeezed. Therefore, the position of the sealing member within the connector connecting chamber is determined by the outer peripheral surface (that is, the annular lips) of the sealing member, and the position of the sealing member within the connector connecting chamber can not be adjusted in accordance with the positions of the connection terminals. Therefore, it has been difficult to mount the sealing member, and more specifically to pass the connection terminals through the respective terminal passage holes in the sealing member. And besides, there has been a strong possibility that the connection terminals, when forcibly inserted, damage the sealing member at their distal ends, so that the sealing performance is adversely affected.

SUMMARY OF THE INVENTION

This invention has been made in view of the above circumstances, and an object of the invention is to provide a casing member having a structure for enhancing the efficiency of an operation for mounting a sealing member in a sealing member chamber.

The above object has been achieved by a casing member of the present invention having features recited in the following Paragraphs.

A casing member comprises:

a casing portion within which an electrical equipment chamber for receiving an electrical equipment therein is formed;

a connector portion which is formed integrally with the casing portion, and includes a sealing member chamber, a partition wall formed between the sealing member chamber and the electrical equipment chamber of the casing portion to separate the sealing member chamber and the electrical equipment chamber from each other, and connection terminals which are fixed to the partition wall, and extend through the partition wall, and have respective electrical contact portions projecting into the sealing member chamber;

a sealing member which is mounted within the sealing member chamber in such a manner that the electrical contact portions of the connection terminals extend through the sealing member; and a sealing member holder fitted on an outer peripheral surface of the connector portion;

wherein a length of that portion of each connection terminal which projects from the partition wall into the sealing member chamber, and includes the electrical contact portion is larger than a length of an outer peripheral wall of the connector portion, extending from the partition wall in surrounding relation to the electrical contact portions of the connection terminals to form the sealing member chamber, so that at least distal end portions of the electrical contact portions of the connection terminals project outwardly from the connector portion in a direction of fitting of the connector portion to a mating connector.

In the casing member of the described above, the electrical equipment is a CCD camera unit, and the CCD camera unit is received within the electrical equipment chamber in a sealed condition.

In the casing member of the construction recited in the described above, at least the distal end portions of the electrical contact portions of the connection terminals project outwardly from the sealing member chamber. Therefore, when the sealing member is to be mounted within the sealing member chamber, first, the distal end portions of the electrical contact portions of the connection terminals are inserted respectively into terminal passage holes in the sealing member so as to effect the positioning of the sealing member, and thereafter the sealing member can be pushed into the sealing member chamber to be mounted therein. Thus, in the casing member of the construction as recited in the described above, the positioning of the sealing member relative to the connector portion can be effected easily, and besides the sealing member is prevented from being damaged by the distal ends of the connection terminals at the time of mounting the sealing member. Therefore, in the casing member of the construction recited in the described above, the efficiency of the operation for mounting the sealing member can be enhanced. After the sealing member is mounted within the sealing member chamber, the sealing member holder is mounted on the connector portion. Therefore, when connecting the connector portion and the mating connector together, first, an inner peripheral surface of that portion of the sealing member holder, disposed at an open end of the sealing member chamber, is fitted to the mating connector, and the mating connector is guided by the inner peripheral surface of the sealing member holder, and the two connectors are positioned relative to each other, and thereafter the connection terminals of the mating connector are connected respectively to the connection terminals in the connector portion.

The casing member described above is suitably used for containing a CCD camera unit as recited in described above.

In the casing member of the present invention, the efficiency of the operation for mounting the sealing member in the sealing member chamber of the connector portion can be positively enhanced, and besides the sealing member is prevented from being damaged by the distal ends of the connection terminals at the time of mounting the sealing member.

DETAILED DESCRIPTION OF THE PREFERRED EMBODIMENTS

A preferred embodiment of the present invention will now be described in detail with reference to the drawings.

Figure 1:
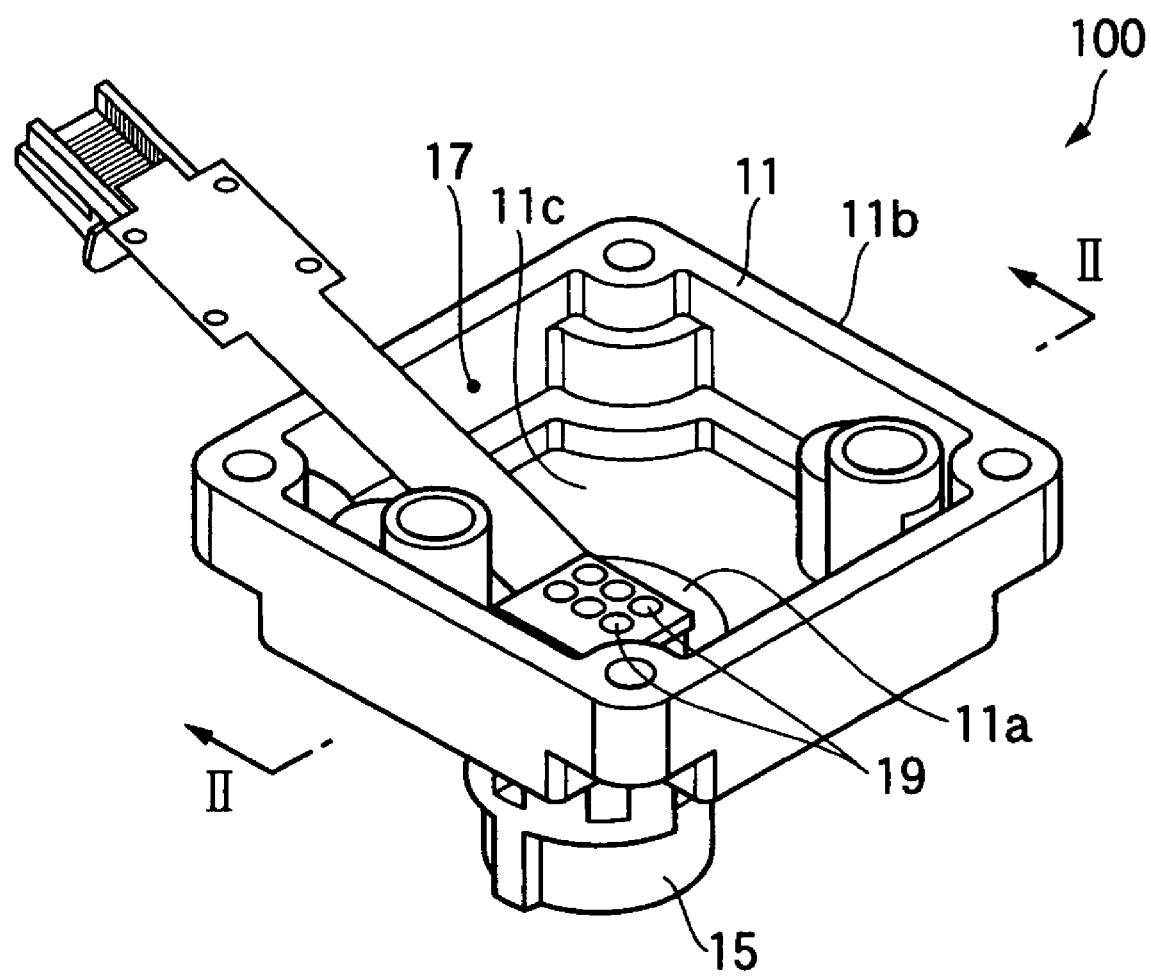
FIG. 1 is a perspective view of one preferred embodiment of a casing member of the present invention.
Figure 2:
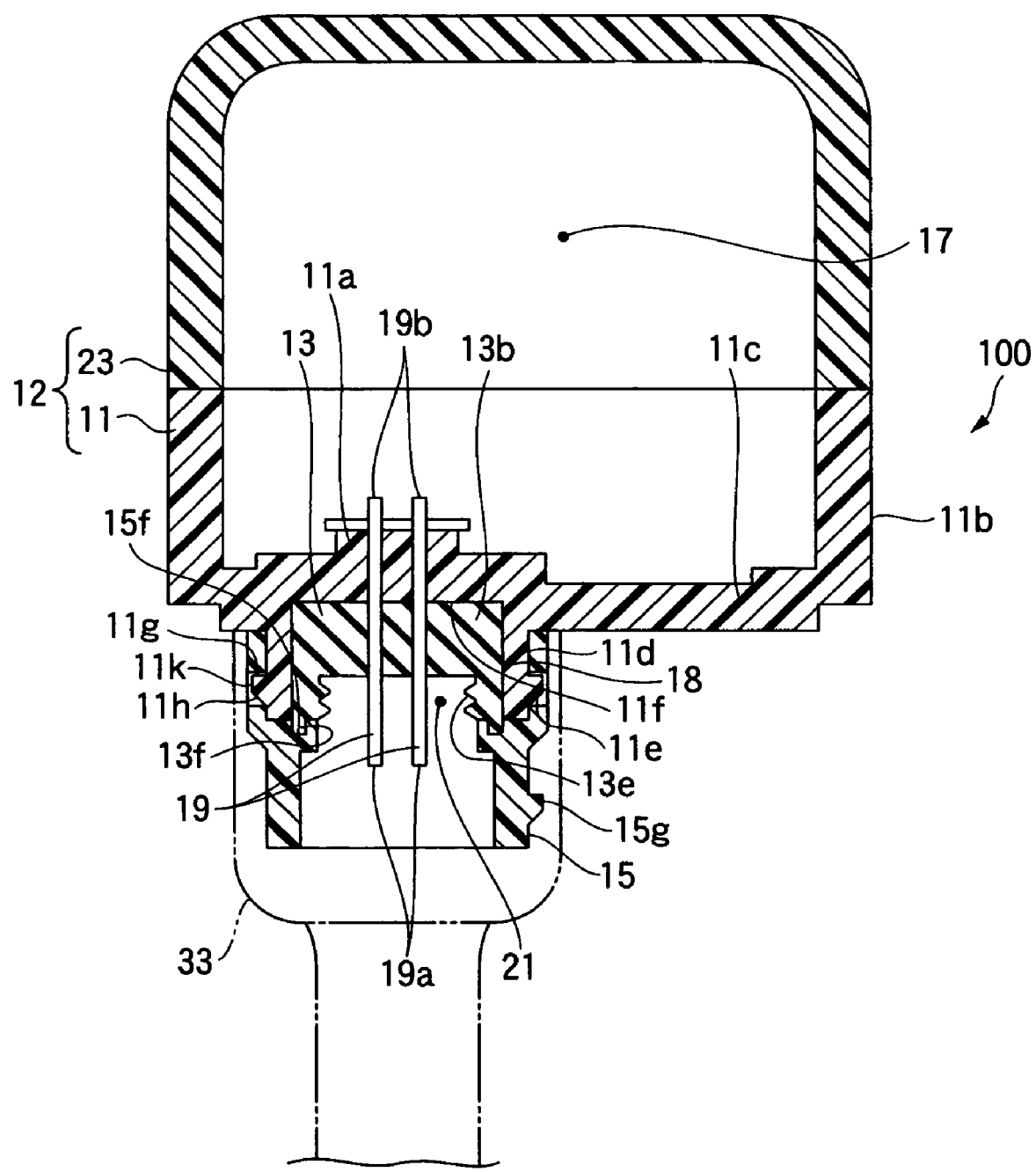
FIG. 2 is a vertical cross-sectional view taken along the line II-II of FIG. 1.
Figure 3:
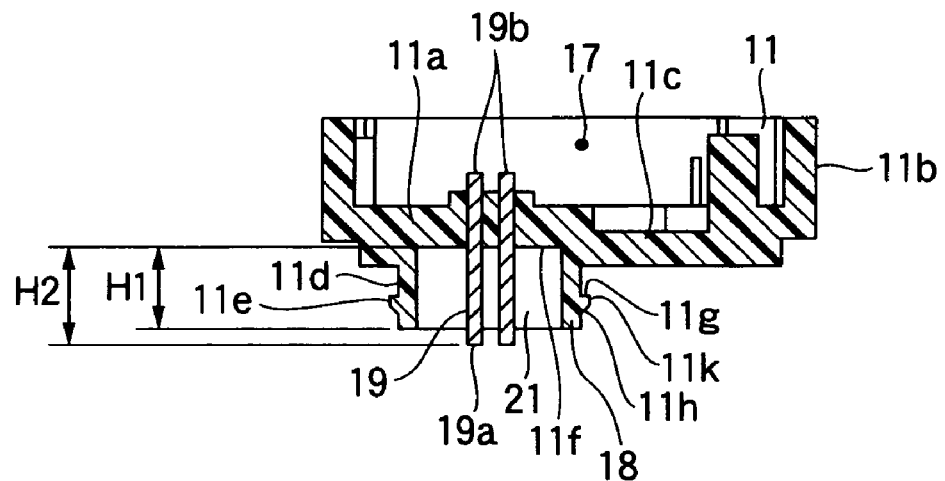
FIG. 3 is a vertical cross-sectional view of a first casing half portion.

As shown in FIGS. 1 to 3, the casing member 100 comprises a casing portion 12, a connector portion 18, the sealing member 13, and the sealing member holder 15. An electrical equipment chamber 17 for containing or receiving an electrical equipment (not shown) such for example as a CCD camera unit is formed within the casing portion 12.

The connector portion 18 is formed integrally with the casing portion 12. The connector portion 18 includes a sealing member chamber 12, a partition wall 11*a* formed between the sealing member chamber 21 and the electrical equipment chamber 17 of the casing portion 12 to separate them from each other, and connection terminals 19 which are fixed to the partition wall 11*a*, and extend through the partition wall 11*a*, and have respective electrical contact portions 19*a* projecting into the sealing member chamber 21.

The sealing member 13 is mounted within the sealing member chamber 21 in such a manner that the electrical contact portions 19*a* of the connection terminals 19 extend through the sealing member 13. The sealing member holder 15 is fitted on an outer peripheral surface of the connector portion 18.

A length (H2 in FIG. 3) of that portion of each connection terminal 19 which projects from the partition wall 11*a* into the sealing member chamber 21 and includes the electrical contact portion 19a is larger than a length (H1 in FIG. 3) of an outer peripheral wall of the connector portion 18 extending from the partition wall 11a in surrounding relation to the electrical contact portions 19a of the connection terminals 19 to form the sealing member chamber 21, so that at least distal end portions of the electrical contact portions 19a of the connection terminals 19 project outwardly from the connector portion 18 in a direction (i.e., a downward direction in FIG. 2) of fitting of the connector portion 18 into a mating connector 33.

Details of the casing member 100 of this construction will be described below.

Describing the casing portion 12 on the basis of its disposition shown in FIG. 2, the casing portion 12 comprises the first casing half portion 11 (made of a synthetic resin) disposed at the lower side, and a second casing half portion 23 (made of a synthetic resin) which is disposed at the upper side, and is joined to the first casing half portion 11 by a suitable joining method such as ultrasonic welding. The electrical equipment chamber 17 is formed within the first and second casing half portions 11 and 23, and is kept in a sealed condition.

The first casing half portion 11 is formed integrally with the synthetic resin connector portion 18 with the metal connection terminals 19 by insert molding. The first casing half portion 11 has a generally U-shaped cross-section, and includes a bottom wall 11c of a generally rectangular shape, a side wall 11b of a rectangular tubular shape extending upwardly from an outer peripheral edge of the bottom wall 11c.

Part of the bottom wall 11c of the first casing half portion 11 serves also as the partition wall 11c of the connector portion 18, and therefore it can be said that the first casing half portion 11 has the partition wall 11a. Namely, the partition wall 11a is the wall which is common to the first casing half portion 11 and the connector portion 18.

That portion of the electrical equipment chamber 7, formed in the first casing half portion 11, is defined by an upper surface (that is, a bottom surface of the electrical equipment chamber 17) of the bottom wall 11c (including the partition wall 11a), and an inner peripheral surface of the side wall 11b, and is open upwardly.

The plurality of bar-like straight connection terminals 19 of the male type are molded in the partition wall 11a by insert molding, and extend through this partition wall 11a in fixed relation thereto. One end portions (that is, the electrical contact portions) 19a of the connection terminals 19 project into the sealing member chamber 21, while the other end portions 19b of the connection terminals 19 project into the electrical equipment chamber 17. The electrical equipment (such for example as a CCD camera unit), received within the electrical equipment chamber 7, is electrically connected to the other end portions 19b of the connection terminals 19.

The connector portion 18 has the cylindrical wall (that is, the outer peripheral wall) 11d of a generally cylindrical tubular shape which extends perpendicularly from the lower surface of the bottom wall 11c (that is, the partition wall 11a), facing away from the electrical equipment chamber 17, in surrounding relation to the plurality of connection terminals 19. The sealing member chamber 21, formed in the connector portion 18, is defined by a lower surface 11f of the partition wall 11a (that is, a bottom surface of the sealing member chamber 21) and the inner peripheral surface of the cylindrical wall 11d, and is open downwardly.

As shown in FIG. 3, the height (length) H1 of the cylindrical wall 11d (More specifically, the distance from the bottom surface 11f of the sealing member chamber 21 to a distal end of the cylindrical wall 11d) is smaller than the length H2 of that portion of each connection terminal 19 projecting into the sealing member chamber 21 (More specifically, the distance from the bottom surface 11f of the sealing member chamber 21 to the distal end of the one end portion 19a of the connection terminal 19). Namely, the distal ends of the connection terminals 19 project outwardly from the cylindrical wall 11d (that is, outwardly from the sealing member chamber 21).

A plurality of retaining portions 11e for engagement with the sealing member holder 15 are formed on the outer peripheral surface of the cylindrical wall 11d, and are spaced from each other in a circumferential direction, and also a plurality of positioning projections (not shown) are formed on this outer peripheral surface, and are spaced from each other in the circumferential direction. Each of the retaining portion 11e includes a flat surface 11g extending perpendicularly (or radially outwardly) from the cylindrical wall 11d, a slanting surface 11h extending in slanting relation to the cylindrical wall 11d, and an interconnecting surface 11k interconnecting the flat surface 11g and the slanting surface 11h.

The purpose of the sealing member 13, mounted in the sealing member chamber 21, is to seal fine gaps formed between the connection terminals 19 and the partition wall 11a, and this sealing member 13 is made of an elastic material such for example as oil-impregnated silicone rubber.

Figure 4:
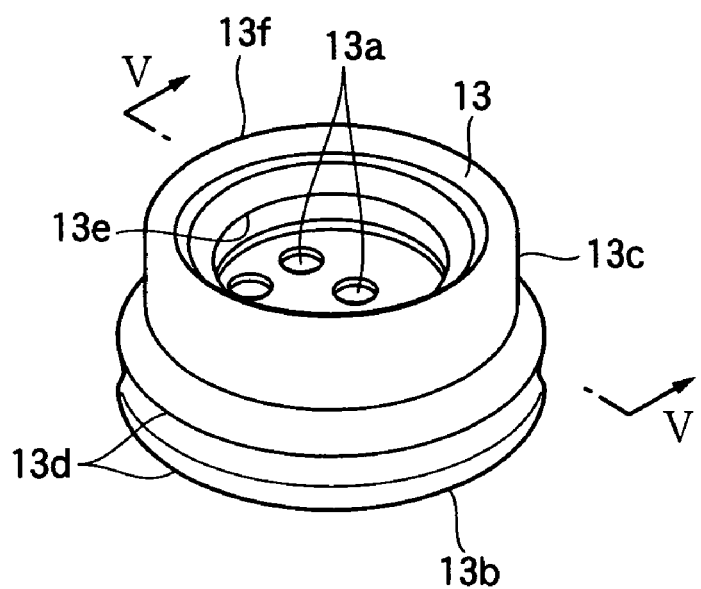
FIG. 4 is a perspective view of a sealing member.
Figure 5:
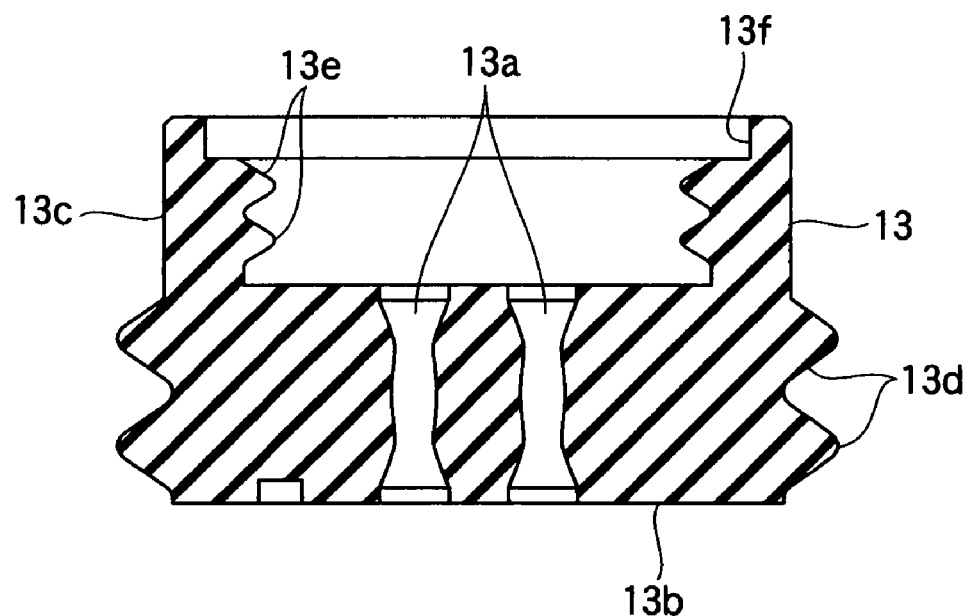
FIG. 5 is a vertical cross-sectional view taken along the line V-V of FIG. 4.

As shown in FIGS. 4 and 5, the sealing member 13 includes a disk-like sealing member body 13b having a plurality of terminal passage holes 13a (corresponding respectively to the plurality of connection terminals 19 arranged in rows in the partition wall 11a), and an annular portion 13c of a tubular shape extending from an outer peripheral edge of the sealing member body 13b in an axial direction.

The annular portion 13c is formed integrally with the sealing member body 13b such that when the sealing member 13 is mounted within the sealing member chamber 21, the annular portion 13c extends in the direction of connection of the connector portion 18 to the mating connector 33 (that is, the downward direction in FIG. 2) in surrounding relation to the one end portions 19a of the connection terminals 19.

Two annular lips 13d are formed on an outer peripheral surface of the sealing member body 13b in parallel relation to each other, and an outer diameter of each of the annular lips 13d is slightly larger than the inner diameter of the sealing member chamber 21. An outer diameter of the annular portion 13c is equal to the inner diameter of the sealing member chamber 21, and two annular lips 13e are formed on an inner peripheral surface of the annular portion 13c in parallel relation to each other.

An inner diameter of each of the annular lips 13e is slightly smaller than an outer diameter of an inner housing (not shown) of the mating connector 33. When the inner housing of the mating connector 33, while deforming the annular lips 13e, is inserted into the sealing member chamber 21 of the connector portion 18, the annular lips 13e form a seal between the mating connector 33 and the connector portion 18.

An annular lip 13f is formed at an outer peripheral edge of the annular portion 13c, and extends in the axial direction. This annular lip 13f is formed integrally with the annular portion 13c such that when the sealing member 13 is mounted within the sealing member chamber 21, the annular lip 13f, like the annular portion 13c, extends in the direction of connection of the connector portion 18 to the mating connector 33 (that is, the downward direction in FIG. 2) in surrounding relation to the one end portions 19*a* of the connection terminals 19. In other words, the annular lip 13*f* extends from the annular portion 13*c* of the sealing member 13 in a direction parallel to the direction of extending of the connection terminals 19.

Figure 6:
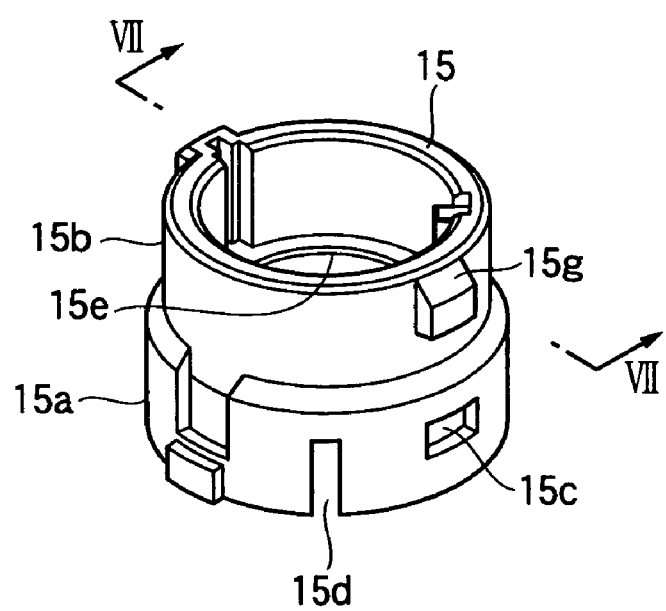
FIG. 6 is a perspective view of a sealing member holder.
Figure 7:
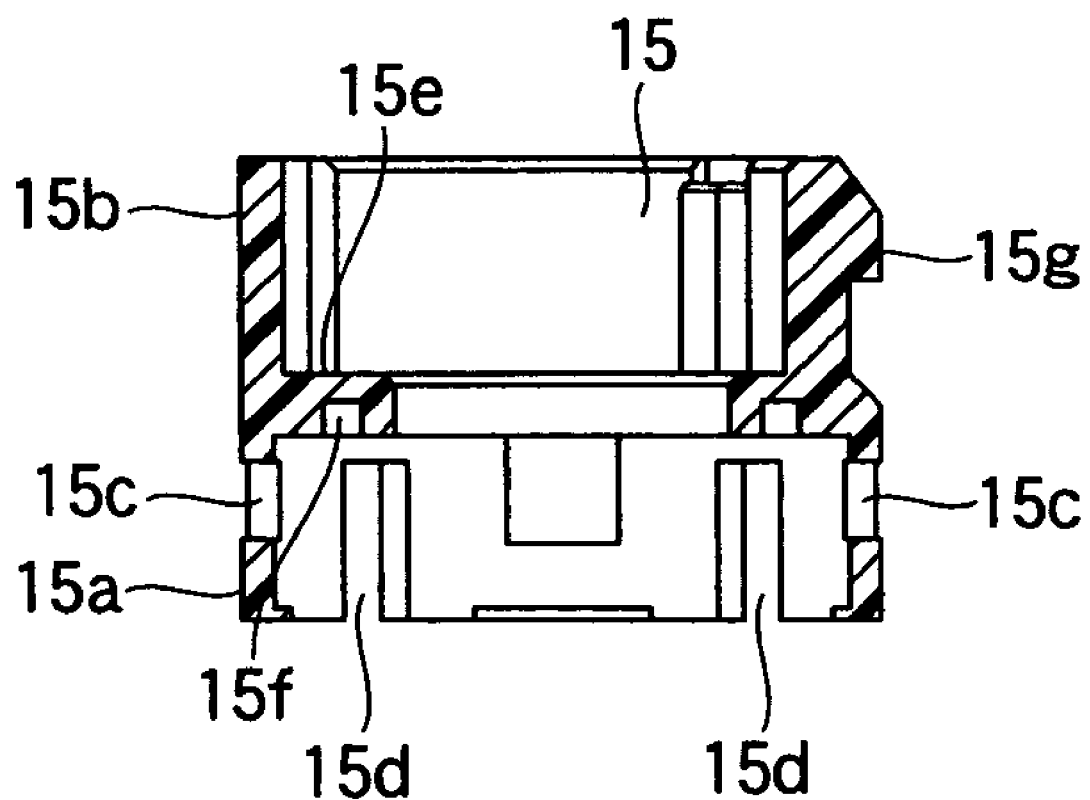
FIG. 7 is a cross-sectional view taken along the line VII-VII of FIG. 6.

As shown in FIGS. 6 and 7, the sealing member holder 15 is made of a synthetic resin, and is formed into a generally hollow cylindrical shape, and includes a larger-diameter portion 15*a*, and a smaller-diameter portion 15*b* extending continuously from the larger-diameter portion 15*a*. An inner diameter of the larger-diameter portion 15*a* is equal to an outer diameter of the cylindrical wall 11*d*, and can be fitted on the cylindrical wall 11*d*. A plurality of engagement holes 15*c* are formed in a side (peripheral) wall of the larger-diameter portion 15*a* so as to correspond respectively to the retaining portions 11*e* on the cylindrical wall 11*d*. Also, a plurality of positioning grooves 15*d* of a U-shaped contour are formed in the side wall of the larger-diameter portion 15*a* so as to correspond respectively to the positioning projections (not shown) on the cylindrical wall 11*d*. When the sealing member holder 15 is fitted on the cylindrical wall 11*d*, the positioning projections (not shown) are engaged respectively in the positioning grooves 15*d* to determine the phase of the sealing member holder 15 in the circumferential direction, and the retaining portions 11*e* are engaged respectively in the engagement holes 15*c* to prevent the sealing member holder 15 from being withdrawn from the cylindrical wall 11*d*.

A ring-like projection 15*e* is formed on an inner peripheral surface of a joint portion between the larger-diameter portion 15*a* and the smaller-diameter portion 15*b*. An annular groove 15*f*, corresponding to the annular lip 13*f* of the sealing member 13, is formed in a flat surface of this ring-like projection 15*e* disposed immediately adjacent to the larger-diameter portion 15*a*, and the annular lip 13*f* can be received in this annular groove 15*f*. Retaining portions 15*g* for being engaged respectively in engagement holes (not shown) in the mating connector 33 are formed on an outer peripheral surface of the smaller-diameter portion 15*b*.

Next, the procedure of assembling the casing member 100 will be described. As shown in FIG. 2, first, the distal end portions of the one end portions 19*a* of the connection terminals 19 are slightly inserted respectively into the terminal passage holes 13*a* formed through the sealing member body 13*b*, and in this condition the positioning of the sealing member 13 in the circumferential direction is effected. At this time, the cylindrical wall 11*d* will not become an obstacle since the distal ends of the one end portions 19*a* of the connection terminals 19 project outwardly from the distal end of the cylindrical wall 11*d* by the distance equal to the difference (H2–H1) between their heights (lengths) as shown in FIG. 3, and therefore the circumferential phase of the sealing member 13 relative to the cylindrical wall 11*d* (and hence the connection terminals 19) can be determined in a short time while angularly moving the sealing member 13. Then, the sealing member 21 is forced into the sealing member chamber 21, so that the two annular lips 13*d* are squeezed, and are held in intimate contact with the inner peripheral surface of the sealing member chamber 21, and at the same time, the connection terminals 19 are caused to pass respectively through the terminal passage holes 13*a* in the sealing member 13, so that the inner peripheral surfaces of the terminal passages holes 13*a* are held in intimate contact with the outer peripheral surfaces of the connection terminals 19, respectively.

Then, the sealing member 15 is lightly fitted on the cylindrical wall 11*d* in such a manner that the positioning projections (not shown) on the cylindrical wall 11*d* of the connector portion 18 are slightly inserted respectively in the positioning grooves 15*d* in the sealing member holder 15, thereby determining the circumferential phase of the sealing member holder 15 relative to the cylindrical wall 11*d*. Then, in this condition, the sealing member holder 15 is pushed, so that the annular lip 13*f* of the sealing member 13 is received in the annular groove 15*f*, while the retaining portions 11*e* of the cylindrical wall 11*d* are engaged respectively in the engagement holes 15*c*, thus completely the mounting of the sealing member holder 15 on the cylindrical wall 11*d*. When the sealing member holder 15 is thus completely fitted on the cylindrical wall 11*d* of the connector portion 18, the annular lip 13*f* is squeezed within the annular groove 15*f*, and bulges radially outwardly to be held in intimate contact with the inner surface of the annular groove 15*f*.

The electrical equipment chamber 17 is positively sealed by the two annular lips 13*d* of the sealing member 13 pressed against the inner peripheral surface of the sealing member chamber 21, the terminal passage holes 13*a* each having the connection terminal 19 passed therethrough, and the annular lip 13*f* received in the annular groove 15*f* in the sealing member holder 15.

In the casing member 100 of the above construction, at least the distal end portions of the one end portion 19*a* of the connection terminals 19 project outwardly from the sealing member chamber 21. Therefore, when the sealing member 13 is to be mounted within the sealing member chamber 21, first, the distal end portions of the one end portions 19*a* of the connection terminals 19 are inserted respectively into the terminal passage holes 13*a* in the sealing member 13 so as to effect the positioning of the sealing member 13, and thereafter the sealing member 13 can be pushed into the sealing member chamber 21 to be mounted therein. Thus, the positioning of the sealing member 13 relative to the connector portion 18 can be effected easily, and besides the sealing member 13 is prevented from being damaged by the distal ends of the connection terminals 19 at the time of mounting the sealing member 13. Therefore, in the casing member 100 of the above construction, the efficiency of the operation for mounting the sealing member 13 can be enhanced.

Thus, in the casing member 100, the efficiency of the operation for mounting the sealing member 13 in the sealing member chamber 21 of the connector portion 18 is excellent, and besides the sealing member 13 is prevented from being damaged by the distal ends of the connection terminals 19 at the time of mounting the sealing member 13. Therefore, the casing member 100 is suitably used for containing the electrical equipment such for example as a CCD camera unit.

Incidentally, after the sealing member 13 is mounted within the sealing member chamber 21, the sealing member holder 15 is mounted on the connector portion 18. Therefore, when connecting the connector portion 18 and the mating connector 33 together, first, the inner peripheral surface of the smaller-diameter portion 15*b* of the sealing member holder 15, disposed at the open end of the sealing member chamber 21, is fitted on the outer peripheral surface of the inner housing (not shown) (having female connection terminals received therein) of the mating connector 33, and the mating connector 33 is guided by the inner peripheral surface of the smaller-diameter portion 15*b* of the sealing member holder 15, and the two connectors are positioned relative to each other, and thereafter the connection terminals of the mating connector 33 are connected respectively to the connection terminals 19.

The present invention is not limited to the above embodiment, and suitable modifications, improvements and so on can be made. The shape, dimensions, numerical values, form, number, disposition, etc., of each of the constituent elements of the above embodiment are arbitrary, and are not limited in so far as the invention can be achieved.

For example, in the above embodiment, although the sealing member 13, the sealing member holder 15 and the connector portion 18 have the annular portions of a circular shape, these members can have generally-annular portions each having other shape than a circular shape.

What is claimed is:

1. A casing member comprising:
    a casing portion within which an electrical equipment chamber for receiving an electrical equipment therein is formed;
    a connector portion formed integrally with said casing portion, said connector portion including:
    a sealing member chamber;
    a partition wall formed between said sealing member chamber and said electrical equipment chamber of said casing portion to separate said sealing member chamber and said electrical equipment chamber from each other;
    connection terminals fixed to said partition wall and extend through said partition wall, each connection terminal have respective electrical contact portions projecting into said sealing member chamber;
    a sealing member mounted within said sealing member chamber in such a manner that said electrical contact portions of said connection terminals passed through said sealing member; and
    a sealing member holder fitted on an outer peripheral surface of said connector portion,
    wherein a length of each connection terminal which is defined by projecting from said partition wall toward said sealing member chamber is longer than a height of an outer peripheral wall of said connector portion extending from said partition wall in surrounding relation to said electrical contact portions of said connection terminals to form said sealing member chamber.

2. A casing member according to claim 1, wherein said electrical equipment is a CCD camera unit, and said CCD camera unit is received within said electrical equipment chamber in a sealed condition.

3. A casing member comprising:
    a casing portion within which an electrical equipment chamber for receiving an electrical equipment therein is formed;
    a connector portion formed integrally with said casing portion, said connector portion including:
    a sealing member chamber;
    a partition wall formed between said sealing member chamber and said electrical equipment chamber of said casing portion to separate said sealing member chamber and said electrical equipment chamber from each other; and
    connection terminals fixed to said partition wall and passed through said partition wall, and each connection terminal have respective electrical contact portions projecting into said sealing member chamber,
    wherein a length of each connection terminal which is defined by projecting from said partition wall toward said sealing member chamber is longer than a height of an outer peripheral wall of said connector portion extending from said partition wall in surrounding relation to said electrical contact portions of said connection terminals.

* * * * *